Oct. 15, 1968     W. SWAROFSKY     3,406,294
LIGHT EXPOSURE METER WITH ANGULARLY ADJUSTABLE
LIGHT CONDUCTING MEANS FOR VARYING THE
ANGLE OF LIGHT ACCEPTANCE
Filed Feb. 28, 1966     3 Sheets-Sheet 1

United States Patent Office 3,406,294
Patented Oct. 15, 1968

3,406,294
LIGHT EXPOSURE METER WITH ANGULARLY ADJUSTABLE LIGHT CONDUCTING MEANS FOR VARYING THE ANGLE OF LIGHT ACCEPTANCE
Walter Swarofsky, Braunschweig, Germany, assignor to Voigtlander A.G., Braunschweig, Germany, a corporation of Germany
Filed Feb. 28, 1966, Ser. No. 530,725
Claims priority, application Germany, Mar. 15, 1965, V 28,064
10 Claims. (Cl. 250—237)

The present invention relates to exposure meters of the type used for photographic purposes in order to determine the extent to which film should be exposed to light.

In particular, the invention relates to that type of exposure meter in which a photosensitive element can receive light from an angular field which is capable of being changed.

Of course, there are known exposure meters where the angular field of light directed to the photosensitive element does not change. In this case, in order to adapt the angular field of light to the angular field of the objective of the camera, a suitable honeycomb window is situated in front of the photosensitive element of the meter, and this photosensitive element receives light which passes through the honeycomb lens. However, since the angular field directed to the photosensitive element through the honeycomb lens cannot be changed, the adapting of different angular fields to the various interchangeable objectives of a given camera is not possible with such a construtcion.

Where a camera uses interchangeable objectives of different focal lengths and, therefore, of different angular fields, it is necessary to adapt the angular field of the light received by the exposure meter to the angular field of the particular objective which is used with the camera. Of course, there are known devices intended to solve this problem, and these known devices take, in general, two basically different forms. In one of the basic forms there is an axial adjustment and in the other of the basic forms there is an adjustment of the size of the aperture through which light reaches the photosensitive element.

Thus, as exemplary of the axially adjustable form, it is known to situate in front of the photosensitive element of the meter a tube which is so interrelated with the photosensitive element that the tube and element can be moved axially relative to each other so as to change the angle of the field of light directed to the photosensitive element through the tube. Also, the meter may take the form of a photosensitive resistance situated behind an objective having a cross section substantially greater than the surface of the resitsor. With this latter type of structure in order to change the angle of the field of light, the photosensitive resistor is shifted along the optical axis of the objective.

With these types of devices, namely those where an adjustment is made axially, the light intensity will necessarily change inasmuch as the ratio between the diameter of the entrance opening for the light and the distance between this latter opening and the light-receiving surface of the photosensitive element changes wtih the adjustment of the tube or photosensitive resitsor. It is therefore essential with this type of construction to provide compensating devices which will maintain the light intensity effectively constant. Such compensating devices take, for example, the form of adjustable resistors which are connected into the light-measuring circuit and which are adjusted in accordance with the particular relative distance between the entrance opening for the light and the light-sensitive element.

As for the second basic form of device, where the size of the aperture through which light reaches the photosensitive element is changed, it is apparent that in this case also adjustments for different angles of the field of light will change the light intensity simply as a result of the change in the size of the opening through which light passes to reach the photosensitive element. Therefore, with this type of structure it is also essential to provide compensating devices.

It is a primary object of the invention to provide an exposure meter of the above general type which, however, has such a construction that it will operate without requiring the use of any compensating devices.

In particular, it is also an object of the invention to provide an exposure meter which has an exceedingly simple construction while at the same time operating with a very high degree of accuracy.

It is furthermore an object of the invention to provide a structure which will not give false readings even in the case where a considerable portion of the scene from which the light which is measured is derived has relatively bright areas.

Also, the objects of the present invention include the provision of an exposure meter capable of using a photosensitive element which has an extremely small light-receiving surface while nevertheless being capable of measuring light received from relatively large angular fields.

Further, it is an object of the invention to provide an exposure meter composed of rugged elements which are easy to operate so that with the invention there is provided an exposure meter capable of operating reliably under many different types of operating conditions and over a long period of time, without requiring any particular maintenance.

According to the invention, the exposure meter includes a photosensitive means and a plurality of tubes through which light passes before reaching the photosensitive means. These tubes have inner ends facing the photosensitive means and from which light is directed from the tubes to the photosensitive means. The tubes have outer ends directed away from the photosensitive means for receiving light which passes through the tubes to the photosensitive means. The tubes are interconnected, by a connecting means, at their outer surfaces in a light-tight manner so that light cannot pass between the tubes to the photosensitive means. An adjusting means of the invention is operatively connected with these tubes for spreading their outer ends apart from each other and for drawing their outer ends inwardly toward each other, so that in this way the angle of the field of light which passes through the tubes to the photosensitive means can be changed.

The invention is illustrated by way of example in the accompanying drawings which form part of the application and in which.

Figure 1:
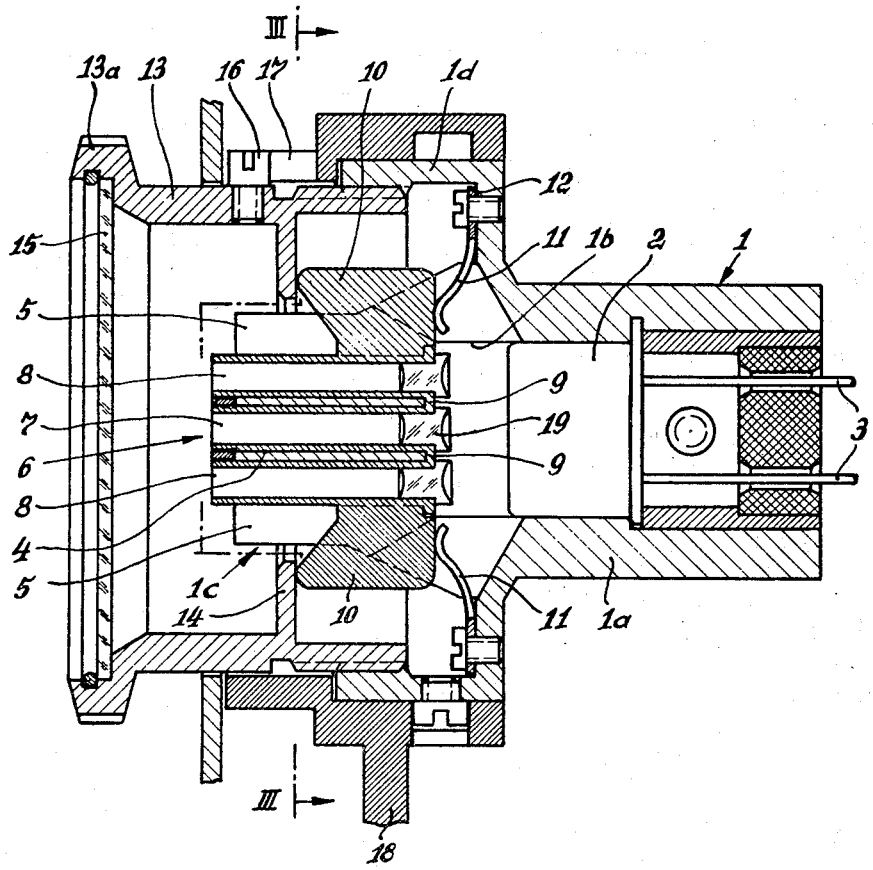
FIG. 1 shows in a longitudinal sectional view one possible embodiment of an exposure meter according to the invention, the exposure meter being shown in FIG. 1 in the position it takes when directing to the photosensitive element the smallest possible angular field of light.

The exposure meter which is illustrated in the drawings includes a housing 1. Part of the housing 1 is formed by a tube 1a. A portion of the tube 1a defines and limits the space between a photosensitive means 2 and an adjustable assembly 6 which directs light to the photosensitive means 2, and this portion of the tube which limits and defines this space has an inner surface 1b which is light-reflecting. In other words this surface 1b is made shiny so that it will have a high degree of light reflection.

The photosensitive means 2 is situated directly within and carried by the tubular portion 1a of the housing 1. This photosensitive means 2 can take the form of a photocell or it may take the form of a photosensitive resistor connected into a suitable electrical circuit. The photosensitive means 2 is connected by the electrically conductive leads 3 with conventional electrical and mechanical components of an exposure meter.

A prolongation of the tube 1a forms a body 1c which functions as a guide means and a support means for supporting and guiding the tubes which form the adjustable assembly 6. For this purpose the body 1c is formed with a central longitudinal bore 4 and with four radially extending slots 5 which are respectively situated in planes which project radially from the axis of the bore 4 and which are uniformly distributed apart from each other so that these radial slots 5 are angularly displaced by 90° from one to the next. As was indicated above, it is this body 1c which receives and supports the assembly 6 which adjusts the angle of the field of light which is directed to the photosensitive element 2.

Figure 3:
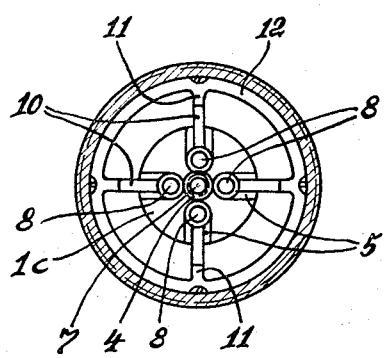
FIG. 3 is a transverse section of the structure of FIG. 1, on a scale smaller than FIG. 1, taken along line III—III of FIG. 1 in the direction of the arrows.

This assembly 6 includes a plurality of tubes made up of a central tube 7, situated in the central bore 4, and a plurality of surrounding tubes 8 which are distributed about the central tube 7. In the illustrated example there are four surrounding tubes 8 respectively situated in the radial slots 5 so that these tubes 8 are also uniformly distributed about the central tube 7 and are situated at angles of 90° from each other. As is apparent particularly from FIG. 3 the outer diameters of the tubes 8 are substantially equal to the widths of the slots 5 so that these tubes 8 will slidably engage the opposed flat side surfaces of the slots 5 during movement in these slots in a manner described below.

A connecting means is provided for interconnecting the tubes 7 and 8 at their exterior surfaces in a light-tight manner, so that light cannot pass between the tubes 7 and 8 to the photosensitive means 2, and this connecting means takes the form of the interconnections 9 extending directly between and interconnecting outer pheripheral portions of the tubes 7 at its inner end, which is nearest to the photosensitive means 2, with adjacent inner end portions of the surrounding tubes 8. The webs which form the connecting means 9 are opaque so as to be light-tight, and in addition they are flexible for a purpose described below. As a result of this arrangement it is not possible for light to pass between the tubes 7 and 8 before reaching the photosensitive means 2. Therefore, the light which reaches the photosensitive means 2 must pass through the tubes.

The outer or surrounding tubes 8 are respectively provided with radially extending projections 10 which are fixed in any suitable way to the tubes 8, and in fact may be formed integrally therewith. These projections 10 take the form of flat plates or fins which extend outwardly beyond the radial slots 5. At their inner ends the projections 10 are respectively engaged by spring fingers 11 which are integral with and project inwardly from a spring ring 12 which is fixed to the housing 1 as by being bolted thereto in the manner shown in FIG. 1. The springy fingers 11 respectively urge the projections 10 and the tubes 8 therewith to the left, as viewed in FIG. 1, away from the photosensitive means 2.

The tubular portion 1a of the housing 1 is integral with a housing portion 1d in the form of a circular ring provided with interior threads receiving the exterior threads of a cylindrical adjusting sleeve 13 which forms part of the adjusting means of the invention. This adjusting sleeve 13 is movable along the axis of the tube 7, which of course coincides with the axis of the bore 4, as a result of the turning of the threads of the sleeve 13 with respect to the threads of the housing portion 1d. The adjusting sleeve 13 has an inwardly directed flange 14 which also forms part of the adjusting means and which engages the outer ends of the projections 10. Of course the springs 11 maintain the projections 10 in engagement with the flange 14 so that when the flange 14 advances to the right, as viewed in FIG. 1, the adjustment takes place in opposition to the spring means 11. In order to facilitate turning of the sleeve 13 it is provided with an exterior knurled flange 13a accessible to the operator. Also, the outer end of the sleeve 13 is closed by a protective transparent glass member 15.

In order to limit the extent to which the sleeve 13 can be axially displaced to the right, from the position shown in FIG. 1, the sleeve 13 carries a stop screw 16 which is simply threaded into the wall of the sleeve 13 and which has a head end adapted to engage a stationary member for limiting the extent of axial movement of the sleeve 13. The housing 1 is carried at its portion 1d by a suitable outer mounting structure 18 which is formed with a cutout 17 large enough to provide unhindered turning of the screw 16 together with the sleeve 13 throughout the entire range of adjustment of the exposure meter. This mounting structure 18 carries the entire meter.

The inner ends of the tubes 7 and 8 respectively carry diverging lenses 19 which image the angular fields of light of the several tubes on the light-receiving surface of the photosensitive means 2.

The above-described structure operates as follows:

In FIG. 1 the assembly of tubes 6 is shown at one end of the range of adjustment. In the particular position of the parts shown in FIG. 1 the smallest possible angle of light will be directed to the photosensitive means. In this position all of the tubes 7 and 8 are parallel to each other. In the illustrated example it is preferred to provide tubes each of which are capable of directing an angle of light on the order of 5° to the photosensitive means 2. The angles of light which are received by the tubes 7 and 8 are projected by the lenses 19 onto the surface of the photosensitive means 2, where the several projected image fields overlap each other in the manner illustrated in FIG. 4. As may be seen from FIG. 4, a circular spot of light 7' is provided by the central tube 7 on the photosensitive means 2 where the entire field of light from the central tube 7 is directly received. This circular field of light 7' is partly overlapped by the circular fields 8' which are derived from the surrounding tubes 8. The remainder of the light is derived by reflection from the inner surface 1b of that part of the tube 1a which defines and limits the space between the inner ends of the tubes 7 and 8 and the photosensitive means 2, as described above. Thus, the entire light which reaches the photosensitive means 2 is derived from the relatively small total angle of light achieved by adjusting the tubes 8 so that they are parallel to each other and the tube 7, as illustrated in FIG. 1.

In the event that the angular field of light is to be adapted for an objective having a greater angular field, then the sleeve 13 is turned further into the housing part 1b. The flange 14 will now displace the projections 10 in opposition to the springs 11 toward the right, as viewed in FIG. 1. The central tube 7 is directly fixed to the body 1c in the central bore 4 thereof, so that this central tube 7 cannot move axially. Therefore, the displacement of the projections 10 to the right can only result in turning of the several tubes 8 at their flexible interconnections 9 with the central tube 7, and the parts will therefore approach the position shown in FIG. 2. As a result the outer ends of the tubes 8 are spread apart from each other and they are of course constrained to move radially along the slots 5, respectively. This adjustment can continue until the parts assume the position shown in FIG. 2 which is the other end position of the exposure meter, and in this latter position it will be noted that the stop screw 16 has engaged an end wall of the outer mounting structure 18. The angular field of light which is directed to the photosensitive element when the parts have the position of FIG. 2 is on the order of 70°.

Figure 2:
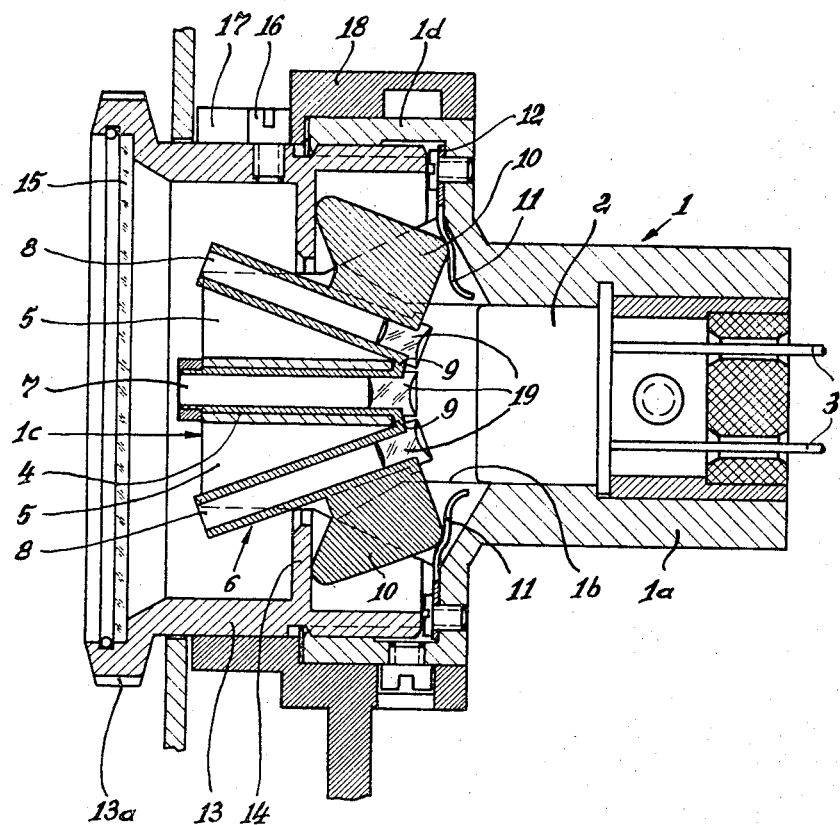
FIG. 2 shows the parts of FIG. 1 in the position they take when directing to the photosensitive element the largest possible angular field of light.
Figure 4:
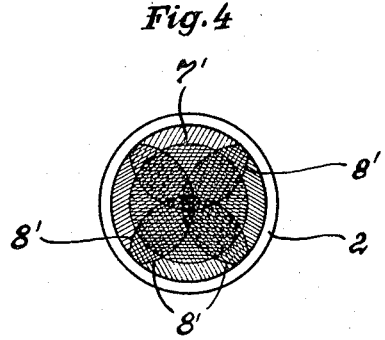
FIG. 4 is a diagrammatic representation of the light-receiving surface of the photosensitive element when it receives light with the meter having the position of FIG. 1.
Figure 5:
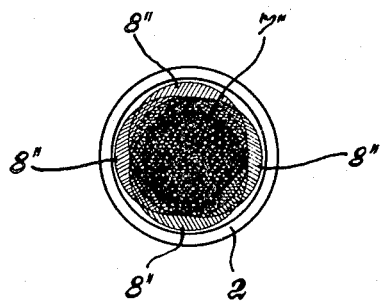
FIG. 5 is a schematic representation of the light-receiving surface of the photosensitive means when the meter has the position shown in FIG. 2.

When the parts have the position shown in FIG. 2, the light-receiving surface of the photosensitive element will have thereon an image as shown in FIG. 5. The image 7' derived from the central tube 7 is now no longer overlapped by the arcuate portions 8' of FIG. 4, but rather by the illustrated images of the other four surrounding tubes 8. Thus, each tube 8 directs a portion of the total field to the photosensitive element, and these portions are respectively indicated at 8" where complete circular spots of light are received from all of the surrounding tubes by the light-sensitive surface of the photosensitive means 2. In the case of FIG. 4 only portions 8' of the circular images of the surrounding tubes impinged directly on the photosensitive surface. Thus, with the arrangement indicated in FIG. 5 the measured light intensity will be the sum of the different angles of light directed by the several tubes onto the photosensitive means 2. Each tube provides its portion of the total light measurement. This total provides an extremely accurate value of the light intensity of the entire scene which is included in the total angle measured by the photosensitive means with the parts in the position of FIG. 2.

Between the end positions of FIGS. 1 and 2 it is possible for the operator to provide any selected intermediate position so that a continuous adapting of the exposure meter to different interchangeable objectives having widely different focal lengths is possible.

The exposure meter of the invention can form an independent unit or it may be built into a camera. In the latter case it is coupled with the adjusting structure for the objectives of different focal lengths, so that with this arrangement the outer mounting structure 18 together with the adjusting structure for the objectives of different focal lengths are movable as a unit and bring about the desired adjustments by acting on the stop screw 16.

The invention is of course not limited to the particular details shown in the drawings and described above. In particular, the number and size of the tubes can be changed. Also, different mechanisms may be used for spreading the tubes apart from each other and drawing them together. For example, a mounting struture may be provided for mounting the tubes for turnable movement intermediate their ends and in this case only a radially operating adjusting device is required to turn the tubes. This adjusting device can operate in a manner similar to and have a construction similar to an iris diaphragm which acts outwardly on the surrounding tubes 8. In this case it is possible to draw the surrounding tubes 8 inwardly toward each other to such an extent that the tubes diverge toward the photosensitive element 2.

Furthermore, the details shown above and described in the drawings need not be used in the disclosed combinations but can be used in any desired combinations.

Thus, with the structure of the invention each individual tube 7, 8 will define a predetermined constant portion of the total angle of light which is measured. When the outer ends of the tubes are drawn inwardly toward each other, so that the parts have a position similar to that of FIG. 1, then there is only a partial overlapping of the angles of light derived from the several tubes so that the entire measured angle is relatively small. On the other hand, when the outer ends of the tubes 8 are spread apart from each other, then the angles of light of the tubes 8 are directed inwardly toward each other and overlap each other to a far greater extent directly on the light-receiving surface of the photosensitive element so that the entire angles of light of the several tubes will be received by the photosensitive element.

It is to be noted that this operation takes place without changing the cross section of the opening through which light enters the meter and without changing the distance of the tubes 7, 8 from the photosensitive means 2, so that with the invention the light-intensity is independent of the angle of light which is directed to the photosensitive means 2. As a result compensating devices, either of electrical or mechanical nature, can be eliminated. In order to change the measured angle of light through a relatively large range it is only necessary to provide an extremely limited degree of axial movement which is only that inherent in the angular displacement of the tubes 8 while their inner ends tilt with respect to the stationary inner end of the central tube 7, so that in fact there is no axial movement or only an extremely small degree of axial movement which would be the horizontal component of the angular movement of the tubes 8 when they are displaced toward the position shown in FIG. 2. This elimination of any axial movement of the structure which directs light to the photosensitive means results in an extremely simple construction. Furthermore, even if there should be relatively large bright portions in the scene from which the angle of light is derived, a false reading will not be provided with the structure of the invention because such relatively bright portions of the scene will be received by only that one of the several tubes which is directed toward the particular bright portion, so that only a relatively small fraction of the total measurement will be undesirably influenced in this way.

As was indicated above, it is preferred to provide tubes which have an angular field on the order of 5°, and they can be adjusted so as to provide a maximum angle of light of 70° directed to the photosensitive element. In this way it is possible to provide for an extremely small light-receiving surface of the photosensitive element and a relatively large range in the adjustable angle of light which can be measured.

The limiting and defining of the space between the assembly 6 and the photosensitive means 2 by the tubular portion 1b which is provided with an inner highly reflecting surface enables all of the light which passes through the tubes to be directed to the photosensitive means even in the case where the parts have the position of FIG. 1. Thus, in this case the light which passes through the surrounding tubes 8 and is not directly received by the photosensitive means is received indirectly by reflection from the inner surface of the tubular means 1b.

The use of diverging lenses 19 at the inner ends of the tubes 7, 8 for imaging the angular fields of the tubes on the photosensitive means enables the overlapping images to be provided on the photosensitive means in spite of the relatively small distance between the inner ends of the tubes and the light-receiving surface of the photo-sensitive means. With this construction a uniform illumination of the photosensitive means is assured, whereas similar results could be achieved only by further displacement of the inner tube ends and the photosensitive means from each other, with a correspondingly required increase in the space essential for the structure. Thus, the compactness of the structure is enhanced by the diverging lenses 19. It is to be noted that if a larger distance were provided between the tubes and the photosensitive means, then a lesser light intensity would be provided for the photosensitive means, so that the device would operate with a lesser degree of sensitivity. Thus, the use of the diverging lenses 19, while not absolutely essential, nevertheless is of considerable advantage with respect to the compactness and sensitivity of the structure.

Where the several tubes have angular fields of 5°, approximately, and are made up of a central tube and four surrounding tubes, as described above and shown in the drawings, then it is possible with relatively little structure to achieve a maximum angular field of 70°, as described above.

What is claimed is:

1. In an exposure meter, photosensitive light-receiving means, and a plurality of tubes situated beside each other and respectively having inner ends facing said photosensitive means for directing light to said photosensitive means from said inner ends of said tubes, said tubes respectively having outer, light-receiving ends directed away from said photosensitive means for receiving light which passes through said tubes to said photosensitive means, connecting means connecting said tubes to each other at their exterior surfaces in a light-tight manner preventing light from passing between said tubes to said photosensitive means, and adjusting means operatively connected with said tubes for spreading their outer ends away from each other and for drawing said outer ends of said tubes inwardly toward each other so as to adjust the angular field of light which is directed through said tubes to said photosensitive means.

2. The combination of claim 1 and wherein said tubes include a central tube and a plurality of surrounding tubes distributed about said central tube, and guide means guiding said surrounding tubes for movement in planes, respectively, which extend radially from the axis of said central tube while said inner ends of said surrounding tubes turn angularly with respect to the inner end of said central tube, said adjusting means being movable along the axis of said central tube and adjusting the positions of said tubes from an inner end position where said surrounding tubes are parallel to each other and to said central tube to an outer end position where said surrounding tubes diverge away from said photosensitive means.

3. The combination of claim 2 and wherein said guide means includes a body formed with a central bore in which said central tube is situated, said body being formed with a plurality of radial slots in which said radial planes are situated, respectively, and said surrounding tubes being respectively situated in said slots for movement therein, said connecting means interconnecting all of said tubes at their inner ends and said surrounding tubes respectively fixedly carrying projections which extend therefrom outwardly beyond said slots, said adjusting means engaging said projections, and spring means acting on said tubes for maintaining said projections in engagement with said adjusting means, so that in at least one direction of adjustment said adjusting means adjusts said surrounding tubes in opposition to the force of said spring means.

4. The combination of claim 3 and wherein said adjusting means includes a rotary threaded sleeve having an inwardly directed flange engaging said projections, and a housing carrying said body and threadedly supporting said sleeve so that when said sleeve is turned with respect to said housing said sleeve will advance along the axis of said central tube and by engagement of its flange with said projections will change the angular positions of said surrounding tubes in said slots, respectively.

5. The combination of claim 4 and wherein said housing has an integral tubular portion carrying said photosensitive means.

6. The combination of claim 1 and wherein a tubular means defines and limits the space between the inner ends of said tubes and said photosensitive means, and said tubular means having an inner light-reflecting surface.

7. The combination of claim 1 and wherein said plurality of tubes respectively carry at their inner ends lenses which image on said photosensitive means the angular field of said tubes, respectively.

8. The combination of claim 1 and wherein each of said tubes has an angular field on the order of 5°.

9. The combination of claim 1 and wherein said plurality of tubes include a central tube and four surrounding tubes distributed about said central tube.

10. The combination of claim 1 and wherein said plurality of tubes include a central tube and a plurality of surrounding tubes distributed about said central tube, mounting means mounting said surrounding tubes for turning movement at intermediate portions of said surrounding tubes situated between said ends thereof, and said adjusting means being situated to one side of said mounting means and turning said surrounding tubes radially toward and away from said central tube, and spring means acting on said tubes for maintaining them in engagement with said adjusting means, said adjusting means moving said surrounding tubes in opposition to said spring means.

References Cited

UNITED STATES PATENTS

| | | | |
|---|---|---|---|
| 2,145,437 | 1/1939 | Thomas | 350—169 X |
| 2,879,691 | 3/1959 | Faulhaber | 88—23 |
| 3,291,990 | 12/1966 | Lentz | 250—83.3 |

FOREIGN PATENTS

| | | |
|---|---|---|
| 372,909 | 3/1923 | Germany. |
| 145,173 | 3/1931 | Switzerland. |

JAMES W. LAWRENCE, *Primary Examiner.*

V. LAFRANCHI, *Assistant Examiner.*